Dec. 9, 1930.

M. SCHLEICHER 1,784,546

APPARATUS FOR CONTROLLING AND INDICATING EARTH
LEAKAGES IN ALTERNATING CURRENT LINES

Filed Nov. 28, 1925

Patented Dec. 9, 1930

1,784,546

UNITED STATES PATENT OFFICE

MANFRED SCHLEICHER, OF BERLIN-CHARLOTTENBURG, GERMANY, ASSIGNOR TO SIEMENS & HALSKE, AKTIENGESELLSCHAFT, OF SIEMENSSTADT, GERMANY, A GERMAN CORPORATION

APPARATUS FOR CONTROLLING AND INDICATING EARTH LEAKAGES IN ALTERNATING-CURRENT LINES

Application filed November 28, 1925, Serial No. 72,002, and in Germany September 16, 1925.

The present invention relates to improvements in apparatus for indicating earth leakages in alternating current lines.

In order to indicate earth leakages in alternating current lines leakage-relays are used which are built up on the watt meter principle, so that they respond to energy received from a certain direction. Hitherto known relays have the drawback that a leakage is indicated only after it has existed for some time. Leakages which consist only of a series of interrupted flashes or single short-lasting leakages are not sufficient to operate such relays at all.

According to the invention a device for indicting and recording the earth leakages of alternating current lines is created in which the drawbacks of the hitherto known devices are eliminated. In the new device special means are arranged which allows actuation of the signal or switching devices by the leakage relay only in a definitely determined direction of energy. If the relay contact is moved through an oppositely directed energy impulse the signal or switching devices remain inoperative. In the relay according to the invention the mass and the damping of the movable system are made so small that a full deflection is obtained even if the leakage lasts for only a few periods of the alternating current or for a still shorter time.

Two constructional forms of the invention are shown by way of examples in the accompanying drawing.

Figure 1:
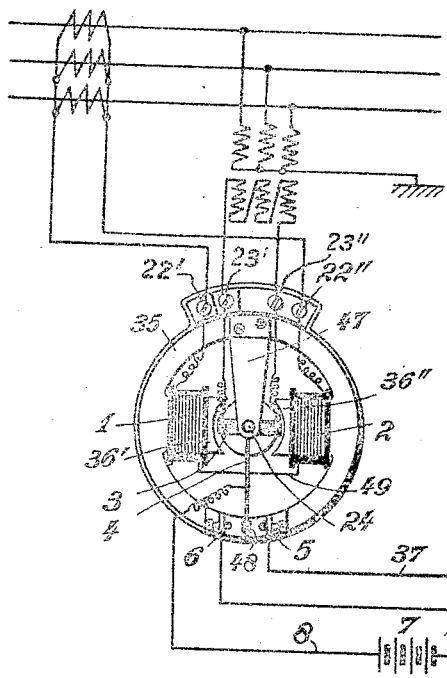
Fig. 1 shows an earth leakage relay having a single signalling and switching mechanism.

In both figures the leakage relay consists of an iron ring 35 on the inner side of which a pair of diametrically opposite magnet poles 36', 36" are disposed, carrying respectively the exciting coils 1 and 2. One end of one of these exciting coils is connected to one of the ends of the other coil by means of the wire 49, and the other ends of the coils are connected to the insulated terminals 22' and 22" respectively.

In the field of the pole pair 36', 36" a coil 3 is rotatably arranged on a spindle 24. One end of the spindle 24 is supported by a bracket 47, which is fastened to the ring 35 by means of screws. The bearing for the other end of the said spindle is not shown in the drawing, but it will be understood that this bearing may be similarly supported. The ends of the coil 3 are connected to the terminals 23' and 23" respectively. On the spindle 24 also an arm 4 is fastened, which at its free end carries a double contact 48. In its zero-position the double-contact is standing between two adjustable but normally fixed contacts 5 and 6, which are arranged on the ring 35 and are insulated from each other. By means of the terminals 22', 22" and 23', 23" the relay is in known manner connected to the alternating current lines to be controlled, so that it acts upon the product of current and tension in the line in question in the manner of a watt-meter.

By means of a wire 8 the contact arm 4 of the relay is connected to one pole of an auxiliary source of current 7, the other pole of which is connected to one end of each of two magnet coils 12 and 13 by means of a wire 39. The other end of the magnet coil 12 is connected by means of a wire 37 to the contact 5, whilst the other end of the magnet coil 13 is connected to the contact 6 by means of a wire 38. The armature of the magnet which is excited by the coil 12 consists of a double lever 9, 16, which is pivotally arranged on a shaft 11. To this armature a signal disc 10 is fastened, which normally is covered but which becomes visible in an inspection aperture 21, when the armature 9 is attracted. The other electro-magnet, which is excited by means of the coil 13 possesses an armature 14, 17, which has the form of a bell crank pivoted at 50. On the free end of the armature part 14 a hook 15 is provided, which is capable of engaging the armature part 16 of the first named electro-magnet. The part 17 operates a contact 18, which normally is open and is lying in a circuit consisting of a battery 19 and a bimetallic thermostatic strip 20. The bimetallic strip is arranged in such a manner that it will exert a pressure on the lever 17 and open the contact 18 when it is heated on account of current passing through it when contact 18 is closed.

The apparatus operates in the following manner:

When the leakage relay receives a rush of energy in a direction in which the signal device is to come into action, the contact arm 4 moves to the right and the double contact 48 closes the contact 5, whereby the following circuit is closed: battery 7, wire 39, coil 12, wire 37, contacts 5, 48, wire 8 and back to battery 7. The coil 12 thus receives current and the magnet excited by the same will attract the armature part 9. The indicator disc 10 is moved to the left and becomes visible in the aperture 21, whereby the attendants are informed that the leakage relay has operated, so that they may take steps to prevent damage. The disc 10 is brought back into its zero-position by hand.

If a rush of energy is received from the opposite direction the contact arm 4 is moved to the left and the double contact 48 will now abut against the contact 6, whereby the following circuit is closed: battery 7, wire 39, coil 13, wire 38, contacts 6, 48, wire 8 and back to battery 7. The coil 13 now receives current and the magnet excited by the same will attract the armature part 14. The hook 15 engages the free end of the lever 16 and the lever 17 which is moved upward will close the contact 18. The hook 15 thereby retains the disc 10 in its zero-position, so that it will not be swung up into visible position when the double contact 48 rebounds from the contact 6 to the contact 5. If the contact 5, 48 is closed on account of a rebounding movement of the contact arm 4, the above mentioned exciting circuit for the coil 12 is also closed, but the magnet can not attract its armature on account of the locking devices 15, 16. As the contact 18 is closed a current from the battery 19 will pass through the bimetallic strip 20 and heat the same. Thereby the strip is stretched and after a while its free end will press against the lever 17 whereby the contact 18 is opened and the locking device 15, 16 is released. The different parts are dimensioned in such a manner that the locking device will be released with so much retardation, that the contact arm 4, 48 has come to rest before the release takes place.

Figure 2:
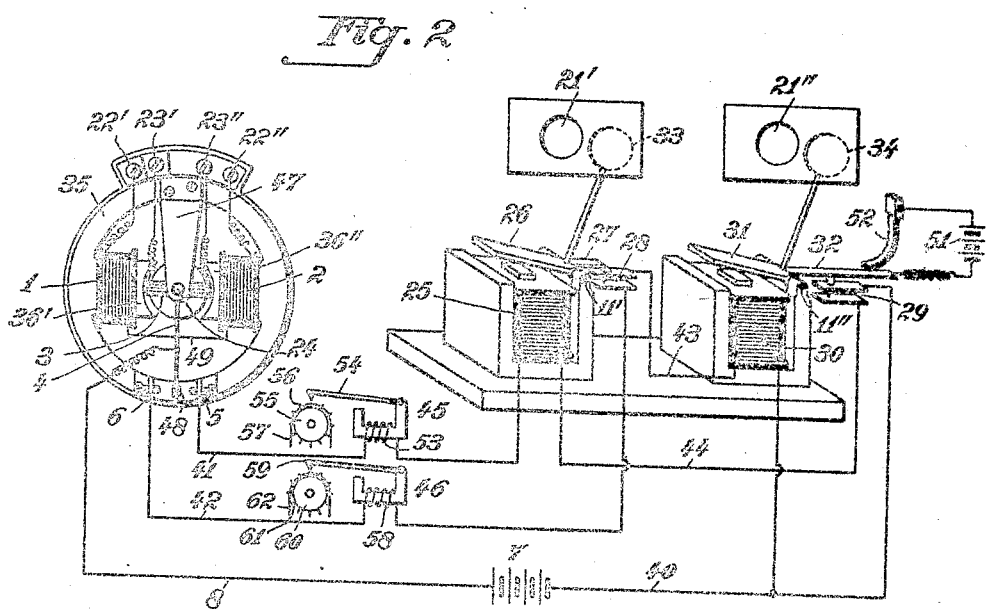
Fig. 2 shows a relay of the same kind having separate signalling and switching mechanisms for each direction of energy.

According to Figure 2 the contact 5 of the above described leakage relay is connected to one end of an electro-magnet coil 25 by means of a wire 41. The other end of the coil 25 is connected over a wire 44, a contact 29 and a wire 40 to one pole of a battery 7. The other pole of this battery 7 is connected to the contact arm 4, 48 by means of a wire 8. Over a wire 42, a contact 28 and a wire 43 the contact 6 of the leakage-relay is connected to one end of a second electro-magnet coil 30, the other end of which is connected to the above mentioned battery connection line 40. The armature 26 of the electro-magnet 25 is pivotally arranged on a shaft 11'. A rearward projection 27 on the armature 26 operates the contact 28. On the armature a signal or indicator disc 33 is arranged which in its normal position is covered, but which when the magnet 25 is excited will appear in the aperture 21' when armature 26 is locked on the shaft 11'. The armature 31 of electro-magnet 30 is pivotally arranged on a shaft 11''. A rearward projection 32 of the armature 31 operates the contact 29. On the armature 31 an indicator disc 34 is fastened, which appears in an observation aperture 21'' when the magnet is excited. The outer end of the armature part 32 is formed of a conducting material and is connected to one pole of a battery 51 the other pole of which is connected to a thermostatic bimetallic strip 52. This strip is so adjusted that it is out of contact with the outer end of the armature part 32 when the armature 31 is not attracted. When the armature 31 is attracted the part 47 touches lightly the free end of the strip 52.

In the wire connections 41 and 42 counting or recording devices 45 and 46 are arranged, on which it may be read off how many times the leakage relay has been operated from one direction or from the other. Usually common counters of known constructions are employed, which show the number of leakages by means of numerals. In many cases however registering counters are preferred. Counters of the last mentioned kind are shown in Fig. 2. The armatures of two electro-magnets, the exciting windings 53 and 58 of which are lying in the wire connections 41 and 42 respectively, are formed as recording devices 54 and 59. The recording pens of the devices are in inoperative position located above the recording strips 57, 62 and do not touch the same. The recording strips 57, 62 are moved at constant velocity through the rollers 55 and 60 by suitable means not shown here, whereby guiding pins 56 and 61 on the edges of the same engage perforations in the paper strips in well known manner. If the relay 35 receives a rush of energy from one side or from another the double contact will abut against the contact 5 or the contact 6, the same as described with reference to Fig. 1.

If it is now assumed that the contact 48 abuts against the contact 5, the following circuit will be closed: battery 7, wire 40, contact 29, wire 44, coil 25, magnet coil 53 of the counter 45, wire 41, contacts 5, 48, wire 8 and back to the battery 7. The magnet of the counter 45 presses the pen of the recording device 54 against the strip 57. The electro-magnet 25 is energized and in the manner described above the signal or indicating disc 33 appears in the aperture 21'. Simultaneously the contact 28 is opened, because it is released from the armature part 27. If now the contact 48 rebounds and thereby abuts against the contact 6 the circuit 7, 40, 30, 43, 28, 46, 42, 6, 48, 8, 7 can not be closed, because the contact 28 is open. The coil 30 can therefore not excite its appertaining magnet and the signal disc 34 will not appear in the aperture 21''. The disc 33 is brought by hand back into its invisible position.

It is now assumed that the leakage relay receives a rush of energy in the other direction so that a contact is effected between the contacts 6 and 48. Hereby the last mentioned of the above traced circuits is closed because contact 28 is closed when disk 33 is in invisible position and the signal disc 34 appears in the aperture 21'', whereby simultaneously the contact 29 is opened, so that the exciting circuit of the coil 25 which includes contact 29 remains interrupted in case a contact between the parts 48 and 5 should occur when the contact 48 rebounds from the contact 6. Further the magnet coil 58 of the counter 46 receives current. The registering device 59 remains in contact with the recording strip 62 until the said circuit again is interrupted. Through the upward movement of the armature part 32, a contact is closed between the outer armature end and the lower end of the bimetallic strip 52. The current from the battery 51 will thus flow through the strip 52 which is heated and straightens. After a certain period the thermal expansion of the strip 52 has effected such a pressure against the lever 32, that the contact 29 again is closed. In the meantime the contact arm 48 of the leakage relay has come to rest in its zero- or middle-position.

It is of course possible to arrange a similar device 47, 51, 52 for the armature 26, 27 as is shown in Figure 2 in connection with the armature 31, 32. The visible signal devices shown in the drawing may easily be replaced by switching devices. It may in many cases also be recommendable to arrange also an acoustic signalling device for instance a bell in connection with the optical signalling device in order to call the attention of the attendants to the operation of the earth leakage relay.

What I claim as my invention and desire to secure by Letters Patents is:—

1. A relay for supervising alternating current lines in regard to earth leakages, comprising in combination a leakage detector having a stationary electromagnetic field system, an oscillatingly arranged system including a movable coil having small damping and being arranged in the field of the said stationary system and a contact arm operated by said coil, said detector having terminals adapted to be connected to the lines to be supervised, a contact device consisting of two stationary contact elements arranged on opposite sides of the said detector contact arm, and adapted to be individually closed by the latter, two electro-magnets having exciting coils, at least one movably arranged indicator armature operated by one of said electro-magnets, and electrical circuit connections including a source of current, one of said stationary contact elements and the exciting coil of one of said electro-magnets, and electromagnetically controlled means for preventing the first exciting coil from moving its armature into indicating position when the said oscillating system moves its contact arm to cooperate with the other of said stationary contact element.

2. A relay for supervising alternating current lines in regard to earth leakages, comprising in combination a leakage detector having stationary field coils, an oscillatingly arranged system including a coil having small damping and being arranged in the field of said stationary coils, and a contact arm operated by said coil, said detector having terminals adapted to be connected to the lines to be supervised, a contact device consisting of two stationary contact elements arranged on opposite sides of the said detector contact arm and adapted to be individually closed by the latter, two electro-magnets having exciting coils, at least one movably arranged indicator armature operated by one of said electro-magnets, and electrical circuit connections including a source of current, one of said stationary elements and the exciting coil of one of said electro-magnets, and means including circuit connections controlled by the other stationary contact element for preventing said exciting coil from moving its armature into indicating position when said contact arm abuts against said other contact element.

3. A relay for supervising alternating current lines in regard to earth leakages, comprising in combination a leakage detector having stationary field coils, an oscillatingly arranged system including a movable coil having small damping and being arranged in the field of said stationary coils, and a contact arm operated by said movable coil, said detector having terminals adapted to be connected to the lines to be supervised, a contact device having two stationary contact elements disposed to coact with said contact arm, two electro-magnets having exciting coils, at least one movably arranged indicator armature operated by one of said electro-magnets, an electric circuit including a source of current, one of said stationary contact elements and the exciting coil of said last mentioned electro-magnet, means controlled by said second electro-magnet for preventing the exciting coil of the first magnet from moving its armature into indicating position when said movable contact arm is deflected to cooperate with the other stationary contact element, and a time controlled resetting device operatively connected to said electromagnetically controlled preventing means and adapted to return said preventing means into inoperative position after the elapse of a desired period.

4. A relay for supervising alternating current lines in regard to earth leakages, comprising in combination a leakage detector having stationary field coils, an oscillatingly arranged system including a movable coil having small damping and being arranged in the field of said stationary coils and a contact arm operated by said movable coil, said detector having terminals adapted to be connected to the lines to be supervised, a contact device consisting of two stationary contact elements arranged on opposite sides of the said detector contact arm and adapted to be closed by said contact arm, two electro-magnets having exciting coils, at least one movably arranged indicator armature operated by one of said electro-magnets, an electric circuit including a source of current, one of said stationary contact elements and the exciting coil of said last mentioned electro-magnet, means controlled by said second electro-magnet for preventing the exciting coil of the first magnet from moving its armature into indicating position when said movable contact arm is deflected to cooperate with the other stationary contact element and a thermostatic member and a heating circuit therefor, controlled by the energization of said second electro-magnet to heat said thermostatic member to return said preventing means from operative to inoperative position after the elapse of a period, determined by the heating of the thermostatic member.

5. A relay for supervising alternating current lines in regard to earth leakages, comprising in combination a leakage detector having stationary field coils, an oscillatingly arranged system including a coil having small damping and being arranged in the field of said stationary coils and a contact arm operated by said coil, said detector having terminals adapted to be connected to the lines to be supervised, a contact device consisting of two stationary contact elements arranged on opposite sides of said contact arm, two electro-magnets, at least one of said magnets having a movably arranged indicator armature, a first electrical circuit including a source of current, one of said stationary contact elements, the exciting coil of the indicator controlling electro-magnet and a circuit interrupter, a second circuit including said source of current, the other of said stationary contact elements and the exciting coil of the second electro-magnet, and an armature controlled by said second electro-magnet adapted to actuate said interrupter to open its circuit when said detector contact arm abuts against said other stationary contact element.

6. A relay for supervising alternating current lines in regard to earth leakages, comprising in combination a leakage detector having stationary field coils, an oscillatingly arranged system including a coil having small damping and being arranged in the field of said stationary coils and a contact arm operated by said coil, said detector having terminals adapted to be connected to the lines to be supervised, a contact device consisting of two stationary contact elements arranged on opposite sides of said detector contact arm, a first electro-magnet having an exciting coil and a movably arranged indicator armature, a second electro-magnet having an exciting coil and a movably arranged indicator armature, two electric circuits having a common source of current and a common connection with said detector contact arm, each circuit including one of said stationary contact elements and the exciting coil of one of said electro-magnets, an interrupter contact within each of said circuits, each interrupter contact being operated by the armature of the electro-magnet located in the other circuit, so that each indicator armature, when in indicating position, opens the circuit of the other electro-magnet, thereby preventing the other indicator armature from being attracted into indicating position.

7. A relay for supervising alternating current lines in regard to earth leakages, comprising in combination a leakage detector having stationary field coils, an oscillatingly arranged system including a coil having small damping and being arranged in the field of said stationary coils and a contact arm operated by said coil, said detector having terminals adapted to be connected to the lines to be supervised, a contact device consisting of two stationary contact elements arranged on opposite sides of said contact arm, a first electro-magnet having an exciting coil and a movable arranged indicator armature, a second electro-magnet having an exciting coil and a movably arranged indicator armature, two electric circuits having a common source of current and a common connection with said detector contact arm, each circuit including one of said stationary contact elements and the exciting coil of one of said electro-magnets, an interrupter contact within each of said circuits, each interrupter contact being operated by the armature of the electro-magnet located in the other circuit, so that each indicator armature, when in indicating position, opens the circuit of the other electro-magnet, thereby preventing the other indicator armature from being attracted into indicating position, and automatic means for positively returning the armature of one of said electromagnets from its indicating position into its non-indicating position after the elapse of a desired period.

In testimony whereof I affix my signature.

MANFRED SCHLEICHER.